(12) United States Patent
Iwa et al.

(10) Patent No.: US 11,231,138 B2
(45) Date of Patent: Jan. 25, 2022

(54) METAL DIAPHRAGM DAMPER

(71) Applicant: Eagle Industry Co., Ltd., Tokyo (JP)

(72) Inventors: Toshiaki Iwa, Tokyo (JP); Yoshihiro Ogawa, Tokyo (JP); Yusuke Sato, Tokyo (JP)

(73) Assignee: EAGLE INDUSTRY CO., LTD.

( * ) Notice: Subject to any disclaimer, the term of this patent is extended or adjusted under 35 U.S.C. 154(b) by 461 days.

(21) Appl. No.: 16/330,706

(22) PCT Filed: Sep. 12, 2017

(86) PCT No.: PCT/JP2017/032776
§ 371 (c)(1),
(2) Date: Mar. 5, 2019

(87) PCT Pub. No.: WO2018/056109
PCT Pub. Date: Mar. 29, 2018

(65) Prior Publication Data
US 2021/0285589 A1 Sep. 16, 2021

(30) Foreign Application Priority Data
Sep. 26, 2016 (JP) .............................. JP2016-186777

(51) Int. Cl.
*F16L 55/053* (2006.01)
*B32B 15/01* (2006.01)
(Continued)

(52) U.S. Cl.
CPC ............ *F16L 55/053* (2013.01); *B32B 15/01* (2013.01); *F02M 55/04* (2013.01); *F04B 11/00* (2013.01);
(Continued)

(58) Field of Classification Search
CPC .. F16L 55/053; F16L 55/04; F16F 9/04; F16J 3/02; F16J 15/52; F04B 11/00; F02M 55/04; B32B 15/01
(Continued)

(56) References Cited

U.S. PATENT DOCUMENTS

| 1,579,536 A | * | 4/1926 | Hodgson | ................. G01L 7/082 |
| | | | | 92/100 |
| 1,809,927 A | * | 6/1931 | Emanueli | ............... H02G 15/26 |
| | | | | 138/30 |

(Continued)

FOREIGN PATENT DOCUMENTS

| CN | 105593510 A | 5/2016 | ............. F02M 55/04 |
| EP | 2693051 | 2/2014 | ............. F04B 43/02 |

(Continued)

OTHER PUBLICATIONS

European Search Report issued in corresponding European Patent Applicaiton Serial No. 17852886.5, dated Apr. 2, 2020 (7 pages).
(Continued)

*Primary Examiner* — Craig M Schneider
*Assistant Examiner* — David R Deal
(74) *Attorney, Agent, or Firm* — Hayes Soloway P.C.

(57) ABSTRACT

A metal diaphragm damper which is resistant to breakage even if repeated stress is applied is provided. The metal diaphragm damper includes a diaphragm that is disk shaped and has a gas enclosed therein the diaphragm has a deforming action part in a center and an outer periphery fixing part on an outer periphery, the deforming action part is formed into a shape curved toward an exterior of the diaphragm, a folded part is formed in a connecting portion of the deforming action part and the outer periphery fixing part and is opened to an inner diameter side, and the folded part is movable in a radial direction.

15 Claims, 7 Drawing Sheets

(51) Int. Cl.
*F02M 55/04* (2006.01)
*F04B 11/00* (2006.01)
*F16F 9/04* (2006.01)
*F16J 3/02* (2006.01)
*F16J 15/52* (2006.01)
*F16L 55/04* (2006.01)

(52) U.S. Cl.
CPC .................................. *F16F 9/04* (2013.01);
*F16J 3/02* (2013.01); *F16J 15/52* (2013.01);
*F16L 55/04* (2013.01)

(58) Field of Classification Search
USPC .......................................................... 138/30
See application file for complete search history.

(56) References Cited

U.S. PATENT DOCUMENTS

| | | | | |
|---|---|---|---|---|
| 3,948,288 A * | 4/1976 | Mayer | .................... | F16L 55/053 |
| | | | | 138/30 |
| 4,077,882 A * | 3/1978 | Gangemi | ............ | A61M 1/3639 |
| | | | | 210/137 |
| 4,205,637 A * | 6/1980 | Ito | .......................... | F02M 55/04 |
| | | | | 123/447 |
| 4,513,194 A * | 4/1985 | Mastromatteo | .... | B23K 15/0086 |
| | | | | 219/121.13 |
| 5,036,879 A * | 8/1991 | Ponci | ........................ | F17D 1/20 |
| | | | | 137/496 |
| 5,094,433 A * | 3/1992 | Dan | ...................... | F16F 13/105 |
| | | | | 138/30 |
| 5,353,766 A | 10/1994 | Peters et al. | ........... | F02M 41/00 |
| 7,467,582 B2 * | 12/2008 | Hembree | ............ | F04B 43/0054 |
| | | | | 92/98 R |
| 10,267,278 B2 * | 4/2019 | Tansug | .................... | F04B 53/10 |
| 10,480,466 B2 * | 11/2019 | Tomitsuka | ............. | F02M 59/44 |
| 2003/0164161 A1 * | 9/2003 | Usui | .................... | F02M 59/366 |
| | | | | 123/510 |
| 2010/0215529 A1 | 8/2010 | Inoue | ............................ | 417/540 |
| 2014/0193280 A1 | 7/2014 | Saito | ....................... | F04B 11/00 |
| 2016/0169173 A1 * | 6/2016 | Yabuuchi | ............... | F02M 59/44 |
| | | | | 417/274 |

FOREIGN PATENT DOCUMENTS

| | | | | |
|---|---|---|---|---|
| GB | 2480695 | | 11/2011 | .............. F16F 13/26 |
| JP | S51151916 | | 12/1976 | ............... B60V 1/06 |
| JP | 2005221000 | | 8/2005 | ................. F01L 1/22 |
| JP | 2011220192 | | 11/2011 | ............. F02M 55/00 |
| JP | 2012-132400 | | 7/2012 | ............. F02M 37/00 |
| JP | 2013064364 | | 4/2013 | ............. F02M 55/00 |
| WO | WO-2016093054 A1 * | | 6/2016 | ......... F02M 37/0041 |

OTHER PUBLICATIONS

Chinese Office Action issued in corresponding Chinese Patent Application Serial No. 201780057264.2, dated Aug. 4, 2020, with translation (15 pages).

International Search Report (w/translation) and Written Opinion (no translation) issued in application No. PCT/JP2017/032776, dated Nov. 21, 2017 (6 pgs).

International Preliminary Report on Patentability issued in application No. PCT/JP2017/032776, dated Apr. 4, 2019 (5 pgs).

* cited by examiner

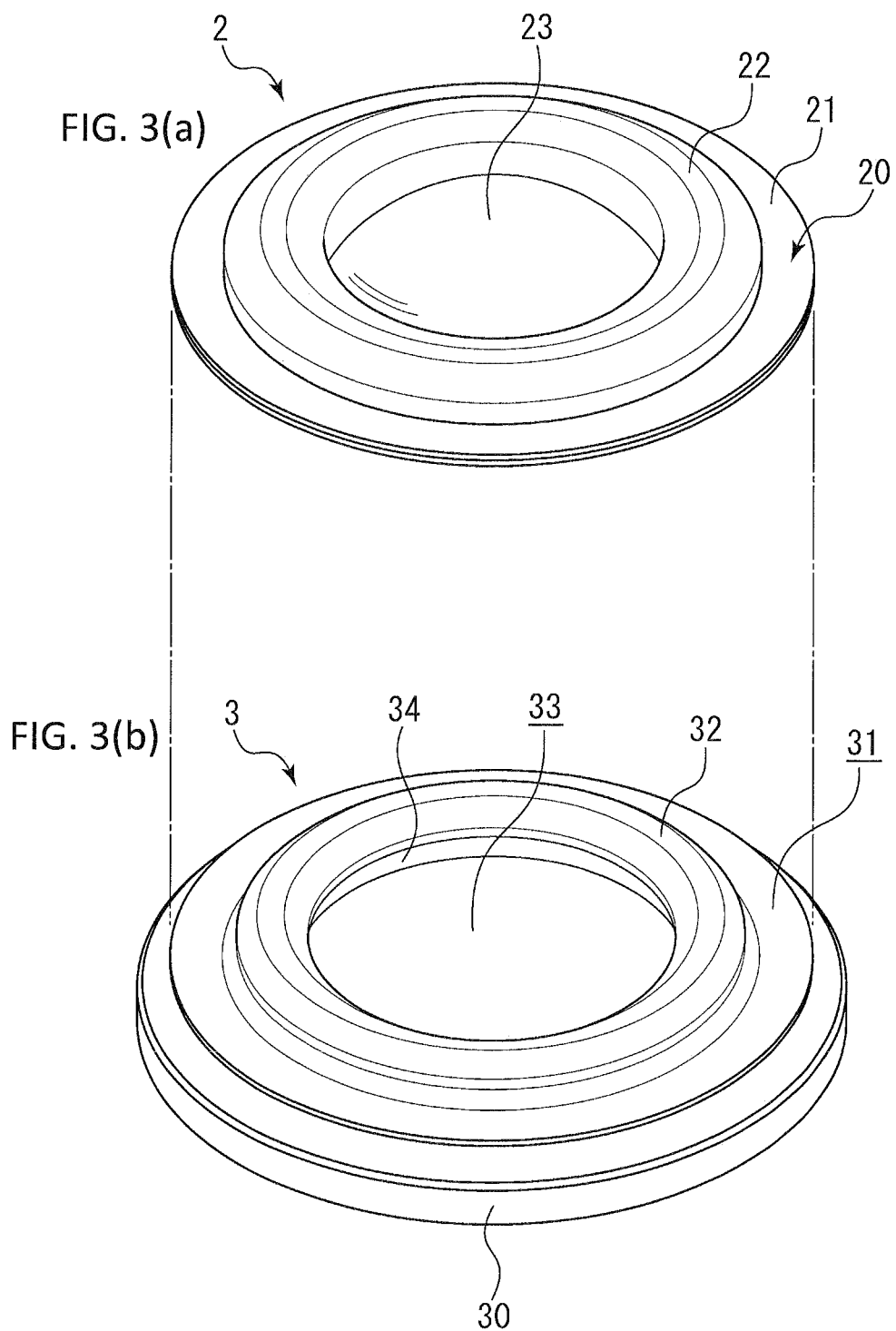

METAL DIAPHRAGM DAMPER

TECHNICAL FIELD

The present invention relates to a metal diaphragm damper for pulsation absorption used in a place where pulsation is generated in a high pressure fuel pump or the like.

BACKGROUND ART

There is a high pressure fuel pump which pumps, to an injector side, fuel supplied from a fuel tank. The high pressure fuel pump pressurizes and discharges the fuel by reciprocation of a plunger driven by rotation of a camshaft of an internal combustion engine.

As the workings of pressurization and discharge of the fuel within the high pressure fuel pump, firstly, a suction valve is opened when the plunger is lowered, and a suction stroke for sucking the fuel into a pressurizing chamber from a fuel chamber formed on a fuel inlet side is performed. Next, a metering stroke for returning a part of the fuel in the pressurizing chamber to the fuel chamber when the plunger is raised is performed, and a pressurization stroke for pressurizing the fuel when the plunger is further raised after closing the suction valve is performed. In this way, the high pressure fuel pump pressurizes the fuel and discharges it to the injector side, by repeating a cycle of the suction stroke, the metering stroke, and the pressurization stroke. At this time, due to change in discharge volume of the fuel from the high pressure fuel pump to the injector and change in injection volume of the injector, pulsation is generated in the fuel chamber.

In such a high pressure fuel pump, a metal diaphragm damper for reducing pulsation generated in the fuel chamber is incorporated therein. For example, as shown in FIG. 7, a pulsation damper (corresponding to a conventional metal diaphragm damper) as disclosed in Patent Citation 1 is provided in a fuel chamber, and two circular plate-shaped diaphragms are bonded to each other at outer diameter side ends, thereby defining an enclosed space in which gas of a predetermined pressure is enclosed in the interior thereof. The pulsation damper varies the volume of the fuel chamber by elastic deformation of a flat plate part of the diaphragm under a fuel pressure accompanied by pulsation, and reduces pulsation.

As shown in FIG. 7A, the diaphragm is composed of the flat plate part, a circular arc-shaped shoulder part continuing to the outer diameter side from the flat plate part, and a circular arc-shaped edge part continuing to the outer diameter side from the shoulder part, in this order from the center (or from the inner diameter side), and the edge parts of two diaphragms are airtightly bonded over the whole circumference on the outer diameter side. Moreover, the curvature radius of the shoulder part is formed to be longer than the curvature radius of the edge part, and the rigidity of the shoulder part is smaller than the rigidity of the edge part. The pulsation damper is supported by a supporting member at the edge part thereof, and is fixed inside a fuel chamber (not shown).

CITATION LIST

Patent Literature

Patent Citation 1: JP 2011-220192 A (Page 11, FIG. 1)

SUMMARY OF INVENTION

Technical Problem

Here, in Patent Citation 1, the pulsation damper is enhanced in rigidity of the edge part on the outer diameter side of two diaphragms, and is supported by the supporting member at the edge part thereof, thereby resulting in a structure in which deformation is hardly generated on the outer diameter side. Therefore, when received a fuel pressure accompanied by pulsation in which high pressure and low pressure are repeated, the flat plate part on the inner diameter side is elastically deformed toward the enclosed space side from a point P (see FIG. 7B) of the shoulder part as a starting point upon reception of the high pressure, and such a shape of the flat plate part is restored to a flat plate shape upon reception of the low pressure. In this way, when absorbing pulsation, there was fear that the shoulder part is broken by repetitive application of a so-called shearing force.

The present invention has been made in view of the above-described problem, and an object thereof is to provide a metal diaphragm damper which is resistant to breakage even if repeated stress is applied.

Solution to Problem

In order to solve the problem, a metal diaphragm damper according to a first aspect of the present invention is a metal diaphragm damper comprising a diaphragm that is disk-shaped and has a gas enclosed therein, the diaphragm having a deforming action part in a center and an outer periphery fixing part on an outer periphery, and the metal diaphragm damper is characterized in that the deforming action part is formed into a shape curved toward an exterior of the diaphragm, a folded part is formed in a connecting portion of the deforming action part and the outer periphery fixing part and is opened to an inner diameter side, and the folded part is movable in a radial direction.

According to the first aspect, in the metal diaphragm damper, when received a fuel pressure accompanied by pulsation in which high pressure and low pressure are repeated, upon reception of the high pressure, the deforming action part is deformed so as to be crushed to an enclosed space side and the folded part is moved in the outer diameter direction, and upon reception of the low pressure, such a shape of the deforming action part is restored and the folded part is moved in the inner diameter direction. In this way, since not a shearing stress but a bending stress acts on the outer periphery fixing part of the diaphragm, the possibility of breakage of the diaphragm can be reduced even if repeated bending stress is applied.

The metal diaphragm damper according to a second aspect of the present invention is characterized by comprising abase member and in that the diaphragm is fixed to the base member, and the base member has a contact surface which extends in a radial direction and with which the folded part contacts.

According to the second aspect, on the contact surface of the base member, the folded part can be smoothly slid in a radial direction.

The metal diaphragm damper according to a third aspect of the present invention is characterized in that the outer periphery fixing part is formed into a shape curved toward the exterior of the diaphragm, and the base member has an annular protuberance part having a profile along an inner surface of the outer periphery fixing part.

According to the third aspect, when the deforming action part is pressurized so as to be crushed to the enclosed space side, the annular protuberance part receives a force acting on the inner diameter side of the outer periphery fixing part, and therefore the stress acting on the outer periphery side of the outer periphery fixing part can be reduced.

The metal diaphragm damper according to a fourth aspect of the present invention is characterized in that the base member has a concave portion over the whole circumference on the inner diameter side of the convex part.

According to the fourth aspect, since the concave portion of the base member is a space over the whole circumference on the outer diameter side of the folded part of the diaphragm, the folded part can be moved to the outer diameter side when the deforming action part is pressurized to the enclosed space side.

The metal diaphragm damper according to a fifth aspect of the present invention is characterized in that the base member has a regulation part configured to regulate deformation of the deforming action part toward a side of an enclosed space of the diaphragm.

According to the fifth aspect, since the maximum deformation volume of the deforming action part can be set, the diaphragm can prevent excess deformation.

The metal diaphragm damper according to a sixth aspect of the present invention is characterized in that the diaphragm has a laminated structure of a plurality of layers.

According to the sixth aspect, since the diaphragm has the laminated structure of the diaphragms, pressure resistance can be enhanced, and the diaphragm can be continuously used as the diaphragm damper even if one of layers is broken.

The metal diaphragm damper according to a seventh aspect of the present invention is characterized in that the layers of the diaphragm are made of the same material.

According to the seventh aspect, the layers of the diaphragm are easily welded to each other.

BRIEF DESCRIPTION OF DRAWINGS

FIG. 3A is a perspective view showing a structure of a diaphragm of the metal diaphragm damper, and FIG. 3B is a perspective view showing a structure of a base member or the diaphragm.

FIG. 6 shows a modification of the metal diaphragm damper,

FIG. 7 shows an example of a conventional metal diaphragm damper.

DESCRIPTION OF EMBODIMENTS

Modes for implementing a metal diaphragm damper according to the present invention will be described hereinafter based on the embodiment.

Embodiment

The embodiment of the metal diaphragm damper will be described with reference to FIG. 1 to FIG. 7. Hereinafter, the lower side of the paper plane of FIG. 2 is assumed to be a front face side (front side) of the metal diaphragm damper, and occasionally a description might be made on the basis of the vertical and horizontal directions when viewed from the front side.

Figure 1:
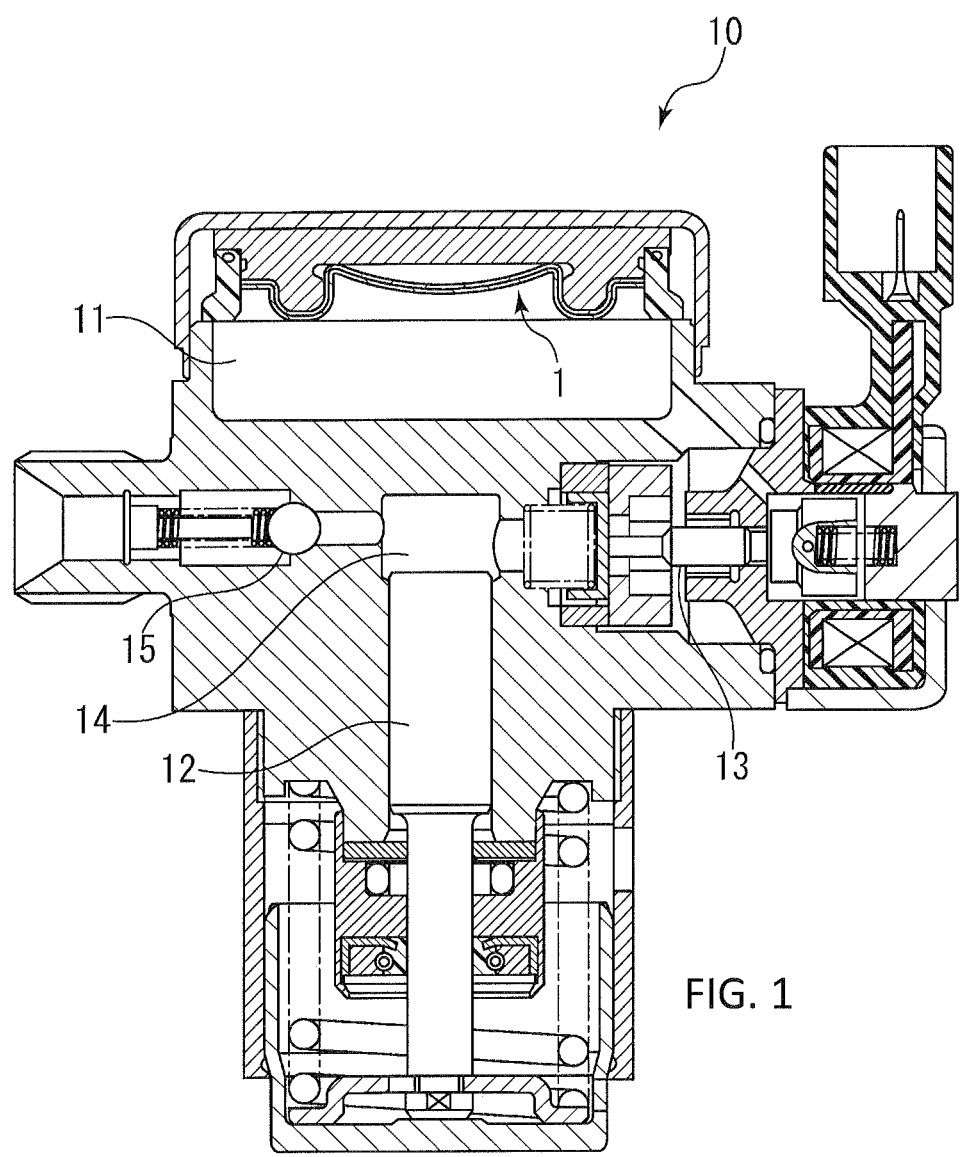
FIG. 1 is a cross-sectional view showing a high pressure fuel pump in which an embodiment of a metal diaphragm damper according to the present invention is incorporated therein.
Figure 2:
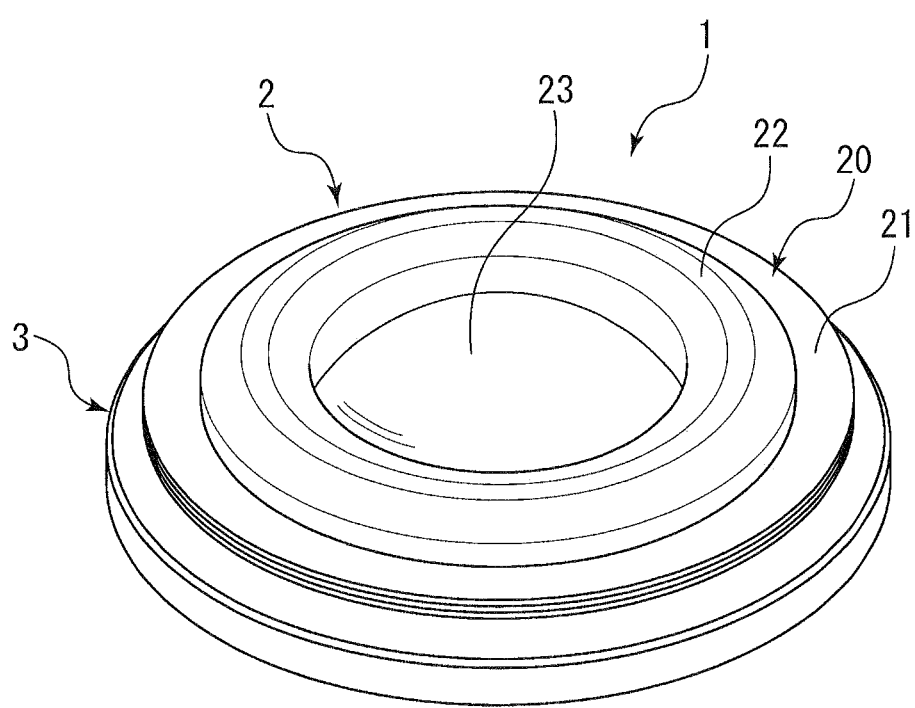
FIG. 2 is a perspective view showing the metal diaphragm damper in the embodiment.

As shown in FIG. 1, a metal diaphragm damper 1 in the present embodiment is incorporated in a high pressure fuel pump 10 which pumps, to an injector side, fuel supplied from a fuel tank through a fuel inlet (not shown). The high pressure fuel pump 10 pressurizes and discharges the fuel by reciprocation of a plunger 12 driven by rotation of a camshaft (not shown) of an internal combustion engine.

As the workings of pressurization and discharge of the fuel within the high pressure fuel pump 10, firstly, a suction valve 13 is opened when the plunger 12 takes a lower side position in FIG. 1, and a suction stroke for sucking the fuel into a pressurizing chamber 14 from a fuel chamber 11 formed on the fuel inlet side is performed. Next, a metering stroke for returning a part of the fuel in the pressurizing chamber 14 to the fuel chamber 11 when the plunger 12 is raised is performed, and a pressurization stroke for pressurizing the fuel when the plunger 12 is further raised after closing the suction valve 13 is performed. In this way, the high pressure fuel pump 10 pressurizes the fuel, opens a discharge valve 15, and discharges it to the injector side, by repeating a cycle of the suction stroke, the metering stroke, and the pressurization stroke. At this time, due to change in discharge volume of the fuel from the high pressure fuel pump 10 to the injector and change in injection volume of the injector, pulsation in which high pressure and low pressure are repeated is generated in the fuel chamber 11.

The metal diaphragm damper 1 in the present embodiment is used for reducing pulsation generated in the fuel chamber 11 of such a high pressure fuel pump 10. In addition, in the fuel chamber 11 of the high pressure fuel pump 10, the metal diaphragm damper 1 forms a part of an inner wall (corresponding to an upper surface of the inner wall in FIG. 1). Moreover, for convenience of the description, in the drawings after FIG. 2, the state that a space above the metal diaphragm damper 1 (corresponding to the fuel chamber 11) is filled with fuel will be described as an example.

As shown in FIG. 2, the metal diaphragm damper 1 is configured into a disk shape by bonding a circular plate-shaped diaphragm 2 (see FIG. 3A) and a circular plate-shaped base member 3 (see FIG. 3B). As described in detail later, the diaphragm 2 and the base member 3 are airtightly bonded over the whole circumference by laser welding.

Within an enclosed space formed between the bonded diaphragm 2 and base member 3 (which is the interior of the metal diaphragm damper 1, and is a space S1 and a space S2 described later (see FIG. 4)), gas of a predetermined pressure including argon, helium or the like is enclosed. In addition, the metal diaphragm damper 1 can acquire a preferred pulsation absorption performance by adjusting a volume change amount by means of an internal pressure of the gas enclosed in the enclosed space.

Figure 4A:
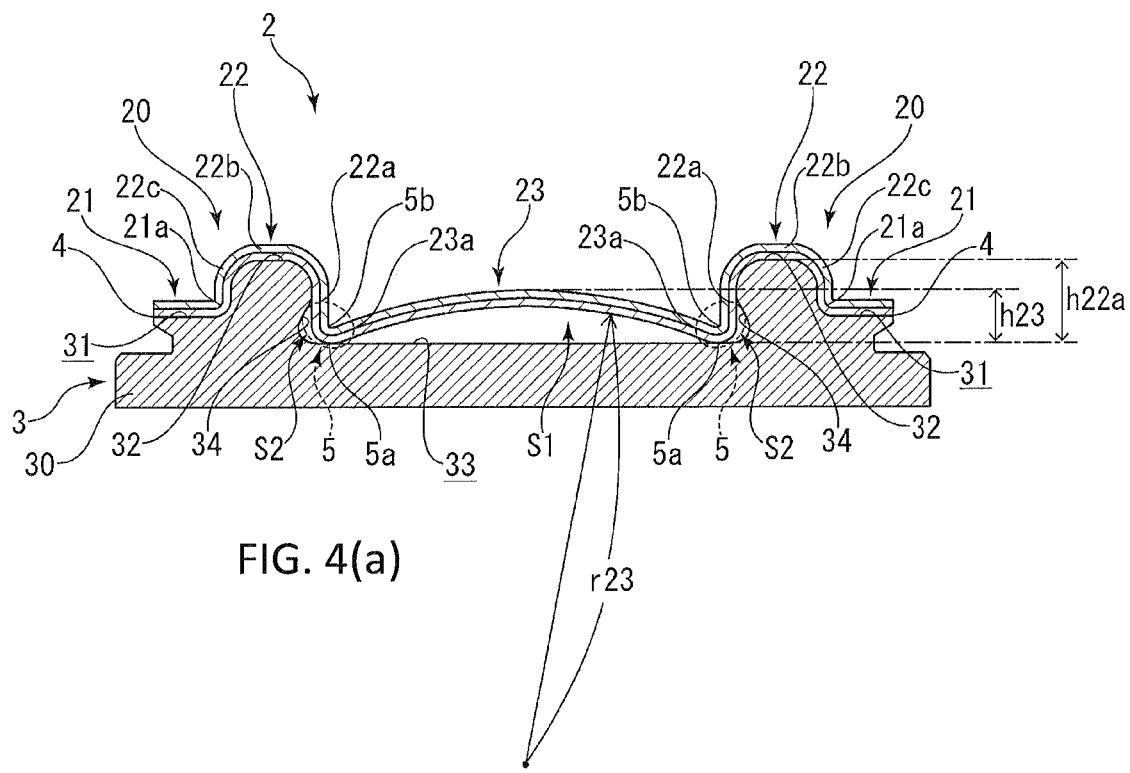
FIG. 4A is a cross-sectional view showing a structure of the metal diaphragm damper upon reception of the low pressure.

As shown in FIG. 3A and FIG. 4A, the diaphragm 2 is formed by press working of a metal plate, and includes an annular bonding end piece 21, curved part 22 sequentially from the outer diameter side and a deforming action part 23 on the center side (or on the most inner diameter side), the annular bonding end piece 21 and the curved part constituting an outer periphery fixing part 20. In addition, the metal plate constituting the diaphragm 2 has a laminated structure because two metal plates made of the same material and having the approximately same shape are stacked and laser-welded, and the whole thereof has a uniform thickness.

As shown in FIG. 4A, the bonding end piece 21 extends so as to be parallel along and onto a bonding surface part 31 (described later) of the base member 3. The bonding end piece 21 and the bonding surface part 31 of the base member 3 are airtightly bonded at the parallel portion over the whole circumference by laser welding, thereby a bonded part 4 is formed.

As shown in FIG. 3A, the curved part 22 constitutes an annular convex part formed so as to have an approximately circular arc shape in a plan view and so as to protrude toward the exterior of the diaphragm 2 (that is, toward the side of the fuel chamber 11) on the outer diameter side of the diaphragm 2. Moreover, as shown in FIG. 4A, the curved part 22 is composed of an inner diameter side end part 22*a*, a connection part 22*b*, and an outer diameter side end part 22*c*, from the inner diameter side. An outer diameter side end part 23*c* continues to an inner diameter side end part 21*a* of the bonding end piece 21, and the inner diameter side end part 22*a* continues to an outer diameter side end part 23*a* of the deforming action part 23. The inner diameter side end part 22*a* of the curved part 22 extends to a position approximately perpendicular to and in the vicinity of a regulation surface part 33 (corresponding to a contact surface and a regulation part) of the base member 3 described later in a state that no pressure of the fuel acts on the deforming action part (also referred to as "a low pressure state").

As shown in FIG. 3A, the deforming action part 23 has a dome shape curved so as to protrude toward the exterior of the diaphragm 2 on the center side (or the inner diameter side). Moreover, as shown in FIG. 4A, the outer diameter side end part 23*a* of the deforming action part 23 continues to the inner diameter side end part 22*a* of the curved part 22 as previously described. Moreover, the deforming action part 23 is formed such that its protrusion amount is smaller toward the exterior of the diaphragm 2 than the previously described curved part 22. Specifically, a protrusion amount h23 of the deforming action part 23 is adjusted so as to be lower than or equal to a length h22*a* in the vertical direction of the inner diameter side end part 22*a* of the curved part 22. Further, a curvature radius r23 of the deforming action part 23 is longer than a curvature radius r22*a* (see FIG. 5) of the curved part 22.

In addition, it is preferable that the shape of the deforming action part 23 is a single continuing curved surface, for example, a dome shape. Accordingly, the fuel pressure almost uniformly acts on the outer surface of the deforming action part 23, thereby the deforming action part 23 is easy to be deformed without being bent in the halfway.

Figure 7A:
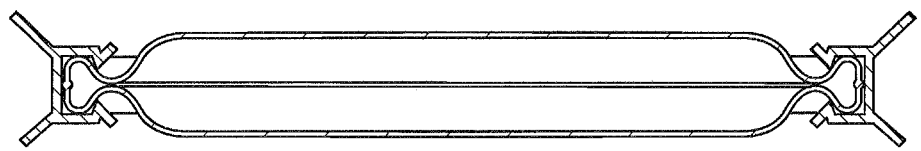
FIG. 7A is a cross-sectional view showing the structure of the metal diaphragm damper reception of the low pressure.
Figure 7B:
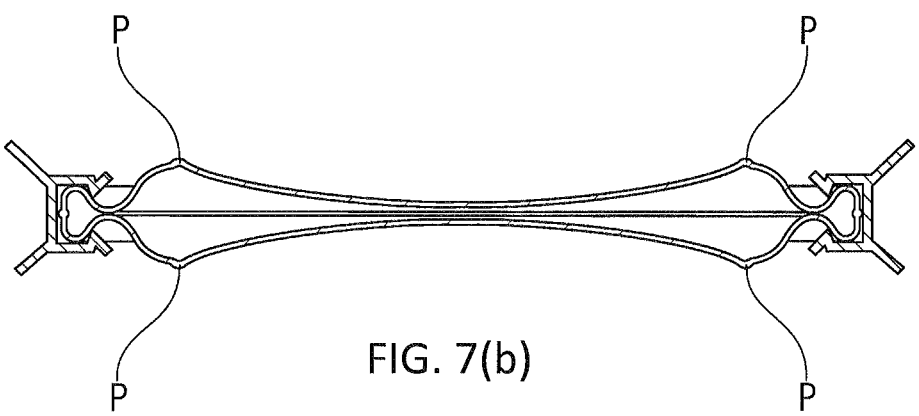
FIG. 7B is a cross-sectional view showing the structure of the metal diaphragm damper upon reception of the high pressure.

Moreover, in the connecting portion of the outer diameter side end part 23*a* of the deforming action part 23 and the inner diameter side end part 22*a* of the curved part 22, a folded part 5 which is opened to the inner diameter side so as to have an outer surface portion facing to the inner diameter side is formed. In addition, the phrase that the folded part 5 is opened to the inner diameter side refers to the state that, on the exterior side of the diaphragm 2, a corner part 5*b* being at an acute angle between the outer diameter side end part 23*a* of the deforming action part 23 and the inner diameter side end part 22*a* of the curved part 22 is opened toward the center side of the diaphragm 2, in other words, the state that, on the exterior side of the diaphragm 2, an imaginary line equally dividing, into two angles, the angle formed by the outer diameter side end part 23*a* of the deforming action part 23 and the inner diameter side end part 22*a* of the curved part 22 is directed to a center line of the diaphragm 2. In contrast, the connecting portion of a shoulder part and an edge part of a conventional diaphragm shown in FIG. 7A is opened to the side orthogonal to the diaphragm, in other words, an imaginary line equally dividing, into two angles, the angle formed by the shoulder part and the edge part is parallel to the center line of the diaphragm. Moreover, in the folded part 5, a curved surface part 5*a* is formed on the enclosed space side. The curved surface part 5*a* contacts the regulation surface part 33 (described later) of the base member 3.

As shown in FIG. 3B and FIG. 4A, the base member 3 is a casting, and on one surface of a circular plate-shaped base part 30, is mainly composed, sequentially from the outer diameter side, of the bonding surface part 31, an annular protuberance part 32 protruding toward the enclosed spaceside (i.e., the side of the diaphragm 2), and the planar regulation surface part 33 extending in a radial direction on the inner diameter side of the annular protuberance part 32. Moreover, on the inner diameter side and on the lower end side of the annular protuberance part 32, a concave portion 34 over the whole circumference is formed.

As shown in FIG. 3B, the bonding surface part 31 annularly protrudes on the outer diameter side of the base part 30. Moreover, as shown in FIG. 4A, the bonding surface part 31 is bonded over the whole circumference to the previously described bonding end piece 21 of the diaphragm 2.

As shown in FIG. 3B and FIG. 4A, the annular protuberance part 32 continues on the inner diameter side from the bonding surface part 31, and annularly protrudes toward the enclosed space side (i.e., toward the side of the diaphragm 2) from the base part 30 while being curved into an approximately circular arc shape. In addition, the outer surface of the annular protuberance part 32 has a profile almost along the inner surface of the curved part 22 of the diaphragm 2. Specifically, the outer surface of the annular protuberance part 32 has a shape almost along the whole of connection part 22*b*, the whole of outer diameter side end part 22*c*, and the upper end portion of the inner diameter side end part 22*a* which constitute the curved part 22 of the diaphragm 2. Accordingly, in a state that the bonding end piece 21 of the diaphragm 2 and the bonding surface part 31 of the base member 3 are bonded, the annular protuberance part 32 can be closely attached along the inner surface of the curved part 22 of the diaphragm 2.

As shown in FIG. 3B and FIG. 4A, the concave portion 34 is curved so as to continue to the annular protuberance part 32 on the inner diameter side of the annular protuberance part 32 and is hollowed to the outer diameter side. Accordingly, an approximately S-shaped curved surface in a cross-sectional view is formed on the inner diameter side of the annular protuberance part 32. In addition, at the low pressure state, the inner diameter side end part 22*a* of the curved part 22 of the diaphragm 2 is separated from the annular protuberance part 32 and the concave portion 34. Moreover, the concave portion 34 is almost flush with the regulation surface part 33 at a side of the base part 30 of the base member 3.

Next, pulsation absorption of the metal diaphragm damper 1 when a fuel pressure accompanied by pulsation in which high pressure and low pressure are repeatedly generated is received will be described by use of FIG. 4 and FIG. 5.

In addition, in the metal diaphragm damper 1, the enclosed space formed between the deforming action part 23 of the diaphragm 2 and the regulation surface part 33 of the base member 3 is referred to as a space S1, and another enclosed space formed between the curved part 22 of the diaphragm 2 and the concave portion 34 of the base member 3 is referred to as a space S2. Moreover, as shown in FIG. 4A, the space S1 and the space S2 are sectioned by the contact portion of the curved surface part 5*a* of the folded part 5 in the diaphragm 2 and the regulation surface part 33 of the base member 3.

Figure 4B:
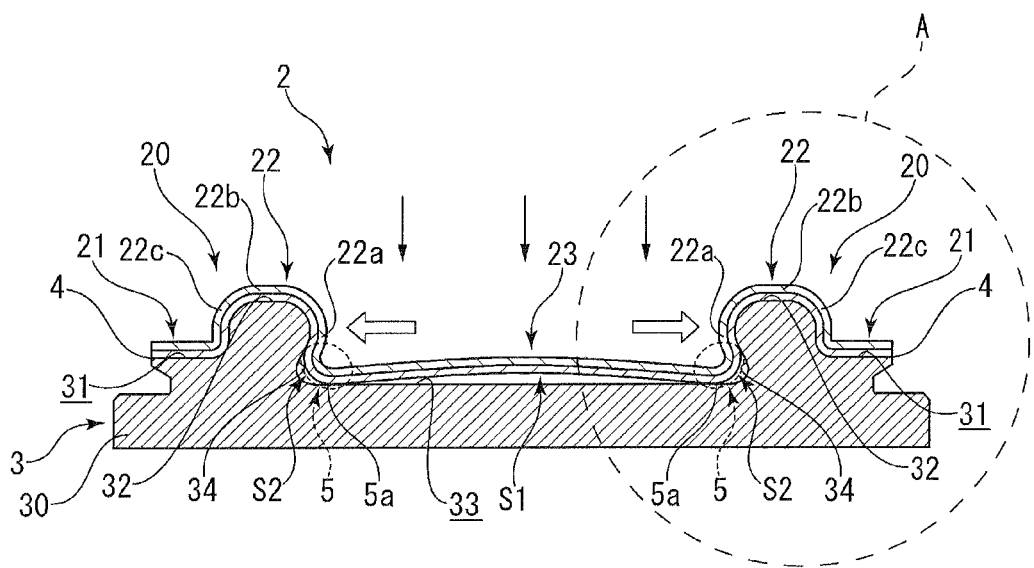
FIG. 4B is a cross-sectional view showing the structure of the metal diaphragm damper upon reception of the high pressure.

As shown in FIG. 4B, when the fuel pressure associated with pulsation is changed from low pressure to high pressure and the whole of the diaphragm 2 receives the fuel pressure almost uniformly from the fuel chamber 11 side, firstly, the dome-shaped deforming action part 23 whose curvature radius is long and whose rigidity is small is deformed so as to be crushed to the space S1 side. In addition, the deforming action part 23 is crushed to the space S1 side, thereby the gas within the space S1 is compressed and moved from the space S1 to the space S2.

Figure 5:
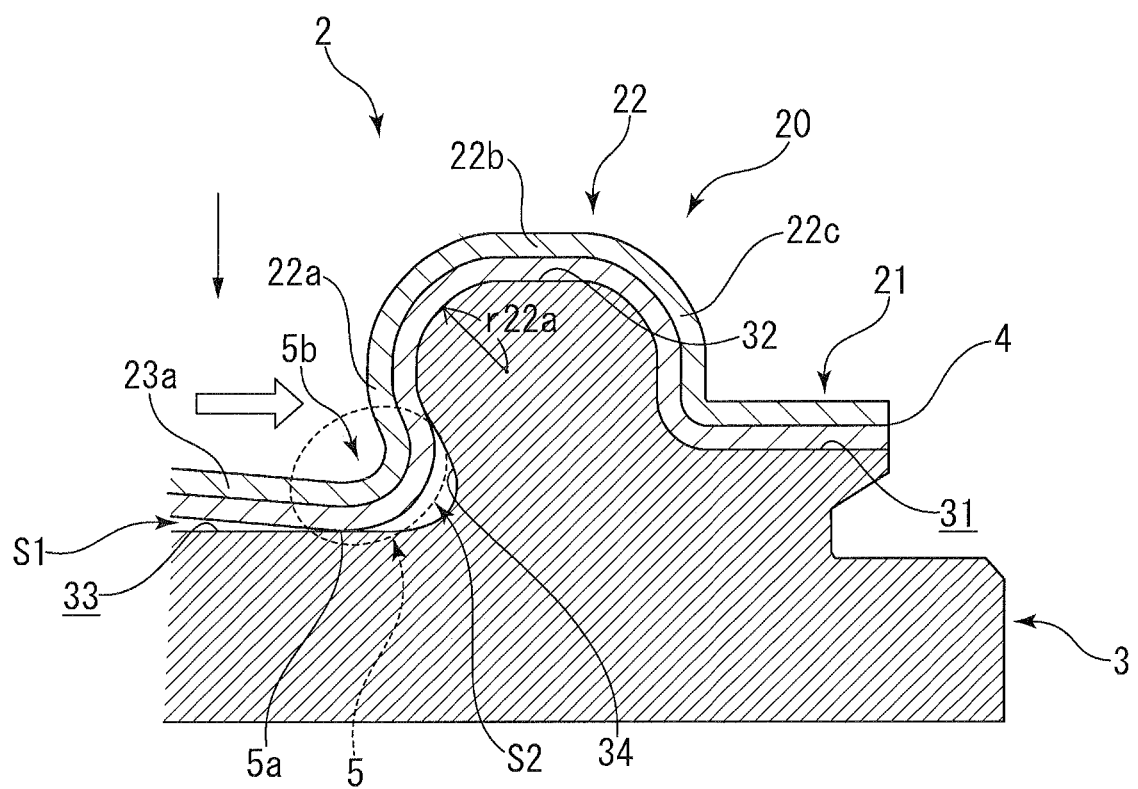
FIG. 5 is a cross-sectional view showing the structure of the metal diaphragm damper in an enlarged portion A of FIG. 4B.

At this time, the folded part 5 is moved to the outer diameter side (within the space S2) so as to release, in a radial direction of the regulation surface part 33 of the base member 3, the stress acting in the direction in which the deforming action part 23 is crushed to the space S1 side (see FIG. 5).

That is, the curved surface part 5*a* of the folded part 5 slides to the outer diameter side in a state of being in contact onto the regulation surface part 33 of the base member 3. In addition, since the regulation surface part 33 of the base member 3 has a planar shape and is configured to be almost flush with the concave portion 34, the curved surface part 5*a* smoothly slides to the outer diameter side on the regulation surface part 33 of the base member 3.

Moreover, upon receiving the stress by which the folded part 5 is moved to the outer diameter side, a bending stress acts on the inner diameter side end part 22*a* of the curved part 22 and thus the diameter side end part 22*a* is flexed to the outer diameter side. Specifically, in FIGS. 4 to 6, the upper end of the inner diameter side end part 22*a* becomes a proximal end and the lower end becomes a free end thereof, thereby being deformed so as to be flexed along the shape of the annular protuberance part 32 of the base member 3 from the upper end side. Since, upon the action of the flex, the upper end portion of the inner diameter side end part 22*a* is configured to enter the concave portion 34 while contacting the upper end portion of the concave portion 34, upward movement of the inner diameter side end part 22*a* is regulated. Accordingly, upon receiving the stress by which the folded part 5 is moved to the outer diameter side, the curved part 22 can be suppressed from being separated upwardly from the annular protuberance part 32 of the base member 3.

Subsequently, when the fuel pressure associated with pulsation is changed from high pressure to low pressure and the fuel pressure which the diaphragm 2 receives from the fuel chamber 11 side becomes small, as shown in FIG. 4A, the deforming action part 23 protrudes into a dome shape toward the exterior of the diaphragm 2 and the shape thereof is restored.

At this time, the folded part 5 is moved to the inner diameter side upon receiving a restoring force of the shape of the deforming action part 23.

In the folded part 5, the inner diameter side end part 22*a* of the curved part 22 is restored to a state approximately perpendicular to the regulation surface part 33 of the base member 3. Moreover, the curved surface part 5*a* is pushed out to the inner diameter side upon receiving a restoring force of the inner diameter side end part 22*a* of the curved part 22 and smoothly slides to the inner diameter side on the regulation surface part 33 of the base member 3 upon receiving a restoring force of the shape of the deforming action part 23.

As described above, in the metal diaphragm damper 1, when received a fuel pressure accompanied by pulsation in which high pressure and low pressure are repeatedly generated, at the high pressure timing, the deforming action part 23 is deformed so as to be crushed to the enclosed space side and the folded part 5 is moved in the outer diameter direction, and at the low pressure timing, such a shape of the deforming action part 23 is restored and the folded part 5 is moved in the inner diameter direction. In this way, since a bending stress acts on the curved part 22 of the diaphragm 2 and a shearing force almost does not act, the possibility of breakage of the diaphragm 2 can be reduced even if repeated bending stress is applied.

Moreover, even if a fuel pressure accompanied by pulsation in which high pressure and low pressure are repeatedly generated is received, the corner part 5*b* of the folded part 5 keeps an acute angle, and the corner part 5*b* of the folded part 5 is not opened to more than 90-degrees. That is, unlike the conventional pulsation damper shown in FIG. 7A, at the high pressure timing, the flat plate part on the inner diameter side is not deformed so as to be folded at an inflection point P (see FIG. 7B) when absorbing pulsation by the shoulder part. Accordingly, since the curved part 22 of the diaphragm 2 is deformed in a state of keeping a curved shape to the same direction, unlike the conventional pulsation damper, a shearing force due to deformation accompanied by folding at the inflection point P does not act.

Moreover, the inner diameter side end part 22*a* of the curved part 22 of the diaphragm 2 is perpendicular to the regulation surface part 33 of the base member 3, or is inclined to the outer diameter side at the lower end thereof. Accordingly, without applying an excessive bending stress on the inner diameter side end part 22*a* of the curved part 22, the folded part 5 can be moved to the outer diameter side.

Moreover, the curved surface part 5*a* of the folded part 5 always contacts the regulation surface part 33 of the base member 3. Accordingly, a shock associated with abutment in the vertical direction of the curved surface part 5*a* of the folded part 5 and the regulation surface part 33 of the base member 3 is not generated, and the deforming action part 23 can be smoothly deformed so as to be crushed to the space S1 side.

Moreover, in the diaphragm 2, the curvature radius r23 of the deforming action part 23 is longer than the curvature radius r22*a* of the inner diameter side end part 22*a* of the curved part 22, and as a result the rigidity of the deforming action part 23 is lower than that of the inner diameter side end 22*a* of the curved part 22. Accordingly, when the whole of the diaphragm 2 almost uniformly receives high fuel pressure, the deforming action part 23 begins to be deformed first. Then, the folded part 5 is moved to the outer diameter side in association with deformation of the deforming action part 23, thereby a bending stress acts on the inner diameter side end part 22a of the curved part 22. In addition, when the fuel pressure is changed from high pressure to low pressure, the inner diameter side end part 22a of the curved part 22 first begins to be restored to a state approximately perpendicular to the regulation surface part 33 of the base member 3. Then, the folded part 5 is moved to the inner diameter side in association with restoration of the inner diameter side end part 22a of the curved part 22, thereby the deforming action part 23 is restored to a dome shape. At this time, a restoring force for restoring to a dome shape acts also on the deforming action part 23 itself. Accordingly, the deforming action part 23 and the inner diameter side end part 22a of the curved part 22 prevents unexpected operation by coordinating with the folded part 5 which smoothly slides on the regulation surface part 33 of the base member 3, and can stably repeat deformation and restoration of the diaphragm 2.

Moreover, the protrusion amount h23 of the deforming action part 23 of the diaphragm 2 is adjusted so as to be lower than or equal to the length h22a in the vertical direction of the inner diameter side end part 22a of the curved part 22, at low pressure. Accordingly, since the inner diameter side end part 22a of the curved part 22 can be arranged on the exterior side of the diaphragm 2 than the deforming action part 23, a bend margin of the inner diameter side end part 22a of the curved part 22, when the folded part 5 is moved to the outer diameter side, can be secured largely.

Moreover, the base member 3 has the annular protuberance part 32 along the inner surface of the curved part 22 of the diaphragm 2. Accordingly, when the deforming action part 23 is pressurized so as to be crushed to the space S1 side and the folded part 5 is moved to the outer diameter side, the annular protuberance part 32 receives the stress acting on the inner diameter side end part 22a of the curved part 22 constituting the inner diameter side of the outer periphery fixing part 20 in the outer diameter direction, and therefore the stress acting on the bonding end piece 21 constituting the outer diameter side of the outer periphery fixing part 20 can be reduced. Therefore, the stress is not applied on the bonding part 4 formed on the outer diameter side of the annular protuberance part 32, which results in the structure in which welding of the diaphragm 2 and the base member 3 is difficult to be peeled.

Moreover, excessive deformation of the deforming action part 23 toward the enclosed space side is regulated by the regulation surface part 33 of the base member 3. Accordingly, the maximum deformation volume of the deforming action part 23 is defined by the regulation surface part 33 of the base member 3, and an excessive stress does not act on the diaphragm 2. Therefore, such a deformation that the deforming action part 23 protrudes toward the lower side (i.e., toward a side of the base part 30) than the regulation surface part 33 of the base member 3, that is, such a deformation that the diaphragm 2 is recurved can be prevented.

Moreover, since the regulation surface part 33 of the base member 3 is formed into a planar shape, the deforming action part 23 can be configured so as not to be recurved certainly. Moreover, even if the deforming action part 23 is crushed until the volume of the space S1 is lost and the whole thereof is closely attached to the regulation surface part 33, the deforming action part 23 and the regulation surface part 33 abut on each other's surfaces, and thereby capable of dispersing the stress equally. Moreover, bending, flaw or the like which causes breakage hardly occurs on the deforming action part 23.

Moreover, although the folded part 5 is moved to the outer diameter side in association with crush of the deforming action part 23 to the space S1 side at high pressure, the folded part 5 and the concave portion 34 do not come in contact (see FIG. 5). Accordingly, to a state that the whole of the deforming action part 23 is crushed until it is closely attached to the regulation surface part 33 of the base member 3, that is, to a state that deformation of the deforming action part 23 reaches the maximum deformation volume, the folded part 5 is certainly moved to the outer diameter side, and the stress can be released. Further, even if the volume of the space S1 becomes zero, the gas at high pressure enclosed in the space S1 can be absorbed in the volume of the space S2 formed on the groove part 34 side.

Moreover, since the diaphragm 2 has an almost uniform thickness, unexpected deformation can be prevented when pressurized. Accordingly, even if a fuel pressure associated with pulsation in which high pressure and low pressure are repeatedly received is received, deformation and restoration can be stably performed in accordance with the fuel pressure. In addition, in the diaphragm 2, it is preferable that the thickness of at least the deforming action part 23 is almost uniform.

Moreover, by a fuel pressure associated with pulsation in which high pressure and low pressure are repeatedly generated, when the deforming action part 23 receives the stress acting in a direction orthogonal to the regulation surface part 33 of the planar base member 3, the folded part 5 is moved so as to release the stress in a radial direction of the regulation surface part 33 of the base member 3. Accordingly, compared to a case where the regulation surface part 33 of the base member 3 has inclination, in either case where the fuel pressure is changed from high pressure to low pressure, or from low pressure to high pressure, the folded part 5 can be efficiently moved in a radial direction in accordance with deformation and restoration of the deforming action part 23.

Moreover, since the diaphragm 2 has a laminated structure by two metal plates, in a case where the diaphragms have the same thickness, for example, compared to a diaphragm constituted by one metal plate, the spring constant of two metal plates constituting the diaphragm 2 can be reduced to approximately half. Therefore, in the metal diaphragm damper designed to have the same volume change amount, pressure resistance can be enhanced. That is, in the metal diaphragm damper designed to have the same pressure resistance, the volume change amount can be approximately doubled, and by allowing the diaphragm to be largely deformed, it can cope with the products requiring a large quantity of fuel under the same applied pressure of the fuel.

Further, since the diaphragm 2 has the laminated structure by two metal plates, the diaphragm 2 can be continuously used as the diaphragm damper 1 even if one of the metal plate is broken.

Moreover, the metal plates constituting the diaphragm 2 are made of the same material, thereby bonding by welding is facilitated. In addition, in the diaphragm 2, in order to reduce a friction coefficient of the metal plate constituting the inner surface of the diaphragm 2, the folded part 5 may be allowed to easily slide on the regulation surface part 33 of the base member 3, for example, by polishing the surface of the metal plate, coating it with a material having low friction coefficient, or the like. Moreover, these processing may be performed on at least the curved surface part 5a of the folded part 5.

Modification

Next, a modification of the metal diaphragm damper will be described by use of FIG. 6. In a metal diaphragm damper 101 in the modification, the curved part 22 of the diaphragm 2 is allowed to be easily deformed by omitting the configuration of the annular protuberance part 32 of the base member 3. It should be noted that the same components as the components shown in the above embodiment are denoted by the same reference signs, and a repetitive description will be omitted.

Figure 6A:
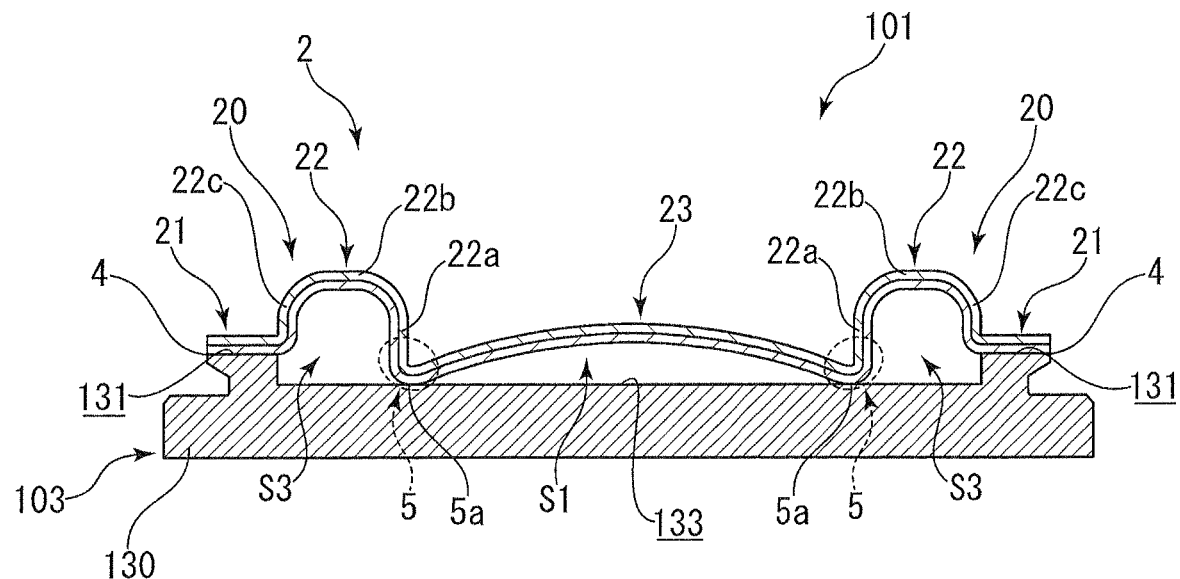
FIG. 6A is a cross-sectional view showing the structure of the metal diaphragm damper upon reception of the low pressure.

As shown in FIG. 6A, a base member 103 is a casting, and on one surface of a circular plate-shaped base part 130, is mainly composed, sequentially from the outer diameter side, of a bonding surface part 131, and a regulation surface part 133 formed into a planar shape on the inner diameter side of the bonding surface part 131. Moreover, the bonding surface part 131 is bonded over the whole circumference to the bonding end piece 21 of the diaphragm 2.

In addition, in the metal diaphragm damper 101, the enclosed space formed between the deforming action part 23 of the diaphragm 2 and the regulation surface part 133 of the base member 103 is referred to as the space S1, and the enclosed space formed between the curved part 22 of the diaphragm 2 and the bonding surface part 131 and regulation surface pat 133 of the base member 103 is referred to as a space S3. In the space S1 and the space S3, gas of a predetermined pressure is enclosed similarly to the aforesaid the embodiment.

Figure 6B:
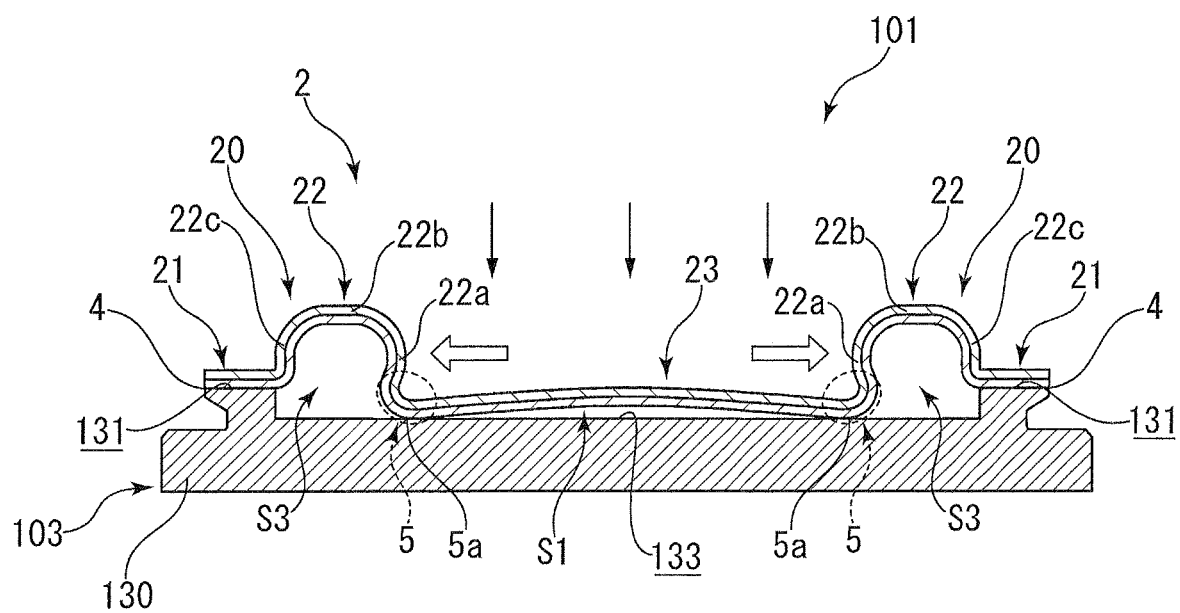
FIG. 6B is a cross-sectional view showing the structure of the metal diaphragm damper upon reception of the high pressure.

As shown in FIG. 6B, in the metal diaphragm damper 101, when the fuel pressure associated with pulsation is changed from low pressure to high pressure and the diaphragm 2 receives high fuel pressure from the fuel chamber 11 side, firstly, the dome-shaped deforming action part 23 whose curvature radius is long and whose rigidity is small is deformed so as to be crushed to the space S1 side.

At this time, the folded part 5 is moved to the outer diameter side (within the space S3) in a radial direction of the regulation surface part 133 of the base member 103 so as to release the stress acting in a direction in which the deforming action part 23 is crushed to the side of the space S1.

Subsequently, when the fuel pressure associated with pulsation is changed from high pressure to low pressure and then the fuel pressure which the diaphragm 2 receives from the fuel chamber 11 side becomes small, as shown in FIG. 6A, the deforming action part 23 protrudes into a dome shape toward the exterior of the diaphragm 2 and the shape thereof is restored.

At this time, the folded part 5 is moved to the inner diameter side upon receiving a restoring force of the shape of the deforming action part 23.

Accordingly, like the metal diaphragm damper 101, even in a case where there is no means for regulating the inner diameter side end part 22a of the curved part 22 from being deformed to be flexed to the outer diameter side when the stress by which the folded part 5 is moved to the outer diameter side is received, similar effects as the previously described metal diaphragm damper 1 are exhibited.

Hereinbefore, although the embodiment of the present invention has been described by the drawings, its detailed configuration is not limited to the embodiment and its modification, and any changes and additions made without departing from the scope of the present invention are included in the present invention.

For example, in the above embodiment, the bonding end piece 21 of the diaphragm 2 and the bonding surface part 31 of the base member 3 have been described to be bonded by laser welding, but are not limited thereto, and they may be bonded by various welding, caulking, or the like as long as an enclosed space can be configured between the diaphragm 2 and the base member 3.

Moreover, in the above embodiment, the metal diaphragm damper 1 has been described as a mode in which it is provided in the fuel chamber 11 of the high pressure fuel pump 10 and reduces pulsation within the fuel chamber 11, but it is not limited thereto, and the metal diaphragm damper 1 may reduce pulsation by being provided in a fuel piping or the like connected to the high pressure fuel pump 10.

In addition, the deforming action part 23 of the diaphragm 2 may have not only a dome shape but also a planar portion.

Moreover, the bonding part 4 may be bonded at least at circumferential edges of the bonding end piece 21 and the bonding surface part 31 of the base member 3 as long as airtightness and bonding strength can be maintained.

Moreover, the metal diaphragm damper 1 does not need to have the configuration of the base member 3, and, for example, in a state that two diaphragms 2, 2 are reversed, each other's bonding end pieces 21, 21 may be bonded into a disk shape. In this case, it is preferable that such a metal diaphragm damper is fixed at the bonding end pieces 21, 21 within the fuel chamber or the like.

Moreover, although an example in which the regulation surface parts 33, 133 of the base members 3, 103 have a planar shape has been described, it is only necessary to be able to regulate deformation accompanied by folding of the diaphragm 2, and for example, the regulation surface part of the base member may be recessed toward the lower side (i.e., toward the side of the base part) to such an extent that the diaphragm 2 is not completely recurved.

Moreover, although an example in which the curved surface part 5a of the folded part 5 is always brought into contact with the regulation surface part 33 or 133 of the base member 3 or 103 has been described, both may be separated from each other at low pressure state.

Moreover, the space S1 and the space S2 or the space S3 do not need to be completely separated.

REFERENCE SIGNS LIST

1 Metal diaphragm damper
2 Diaphragm
3 Base member
4 Bonding part
5 Folded part
5a Curved surface part
5b Corner part
10 High pressure fuel pump
20 Outer periphery fixing part
21 Bonding end piece (Outer periphery fixing part)
22 Curved part (Outer periphery fixing part)
23 Deforming action part
31 Bonding surface part
32 Annular protuberance part
33 Regulation surface part (Contact surface, Regulation part)
34 Concave portion
S1 to S3 Space

The invention claimed is:

1. A metal diaphragm damper comprising a diaphragm that is disk shaped and has a gas enclosed therein, the diaphragm having a deforming action part in a center and an outer periphery fixing part on an outer periphery, wherein
the deforming action part is formed into a shape curved toward an exterior of the diaphragm,
a folded part is formed in a connecting portion of the deforming action part and the outer periphery fixing part and is opened to an inner diameter side, and the folded part is movable in a radial direction,
the metal diaphragm damper further comprises a base member,
the diaphragm is fixed to the base member, and
the base member has a contact surface which extends in a radial direction and with which the folded part contacts.

2. The metal diaphragm damper according to claim 1, wherein
the outer periphery fixing part is formed into a shape curved toward the exterior of the diaphragm, and
the base member has an annular protuberance part having a profile along an inner surface of the outer periphery fixing part.

3. The metal diaphragm damper according to claim 2, wherein the base member has a concave portion over the whole circumference on the inner diameter side of the annular protuberance part.

4. The metal diaphragm damper according to claim 3, wherein the base member has a regulation part configured to regulate deformation of the deforming action part toward a side of an enclosed space of the diaphragm.

5. The metal diaphragm damper according to claim 3, wherein the diaphragm has a laminated structure of a plurality of layers.

6. The metal diaphragm damper according to claim 5, wherein the layers of the diaphragm are made of the same material.

7. The metal diaphragm damper according to claim 2, wherein the base member has a concave portion over the whole circumference on the inner diameter side of the annular protuberance part.

8. The metal diaphragm damper according to claim 2, wherein the base member has a regulation part configured to regulate deformation of the deforming action part toward a side of an enclosed space of the diaphragm.

9. The metal diaphragm damper according to claim 2, wherein the diaphragm has a laminated structure of a plurality of layers.

10. The metal diaphragm damper according to claim 9, wherein the layers of the diaphragm are made of the same material.

11. The metal diaphragm damper according to claim 1, wherein the base member has a regulation part configured to regulate deformation of the deforming action part toward a side of an enclosed space of the diaphragm.

12. The metal diaphragm damper according to claim 11, wherein the diaphragm has a laminated structure of a plurality of layers.

13. The metal diaphragm damper according to claim 12, wherein the layers of the diaphragm are made of the same material.

14. The metal diaphragm damper according to claim 1, wherein the diaphragm has a laminated structure of a plurality of layers.

15. The metal diaphragm damper according to claim 14, wherein the layers of the diaphragm are made of the same material.

* * * * *